United States Patent
Morrison et al.

(10) Patent No.: US 12,467,427 B2
(45) Date of Patent: Nov. 11, 2025

(54) ANTI-ROTATION RETAINING MECHANISM FOR A HIGH-PRESSURE FUEL INJECTOR IN A FUEL SYSTEM

(71) Applicant: CUMMINS INC., Columbus, IN (US)

(72) Inventors: Patrick M. Morrison, Columbus, IN (US); Jordan P. Steele, Franklin, IN (US); Michael A. Lucas, Columbus, IN (US); Derek G. Weiler, North Vernon, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/908,482

(22) PCT Filed: Dec. 31, 2020

(86) PCT No.: PCT/US2020/067649
§ 371 (c)(1),
(2) Date: Aug. 31, 2022

(87) PCT Pub. No.: WO2021/194601
PCT Pub. Date: Sep. 30, 2021

(65) Prior Publication Data
US 2023/0109924 A1    Apr. 13, 2023

Related U.S. Application Data

(60) Provisional application No. 63/014,285, filed on Apr. 23, 2020, provisional application No. 62/994,032, filed on Mar. 24, 2020.

(51) Int. Cl.
*F02M 61/14*    (2006.01)

(52) U.S. Cl.
CPC ..... *F02M 61/14* (2013.01); *F02M 2200/8015* (2013.01); *F02M 2200/8038* (2013.01); *F02M 2200/8061* (2013.01)

(58) Field of Classification Search
CPC ................. F02M 61/14; F02M 55/005; F02M 2200/852; F02M 2200/8066;
(Continued)

(56) References Cited

U.S. PATENT DOCUMENTS 5,685,730 A  *  11/1997  Cameron ........... H01R 13/6397
                                                              D13/133
6,418,912 B1    7/2002  Lorraine
(Continued)

FOREIGN PATENT DOCUMENTS

EP            1273793 B1    7/2005

OTHER PUBLICATIONS

International Search Report and Written Opinion for International patent application No. PCT/US2020/067649, filed Dec. 31, 2020, mailed Mar. 19, 2021.

*Primary Examiner* — John Kwon
(74) *Attorney, Agent, or Firm* — Taft Stettinius & Hollister LLP

(57) ABSTRACT

Apparatuses for immobilizing fuel injection apparatuses are disclosed. A coupling member couples a fuel injection apparatus with an injector body of an engine. The coupling member includes a top surface, a bottom surface, a side surface, and an opening extending from the top surface to the bottom surface. The opening receives the fuel injection apparatus. The coupling member also includes a protruding portion extending from the bottom surface or the side surface which comes into contact with the injector body to prevent rotational movement of the fuel injection apparatus.

20 Claims, 5 Drawing Sheets

(58) Field of Classification Search
CPC .. F02M 61/168; H01R 13/6397; H01R 33/97; F16K 31/047; F16K 31/10
See application file for complete search history.

(56) References Cited

U.S. PATENT DOCUMENTS

| | | | |
|---|---|---|---|
| 7,086,876 B1 * | 8/2006 | Montena | H01R 13/6397 |
| | | | 439/304 |
| 7,607,418 B2 | 10/2009 | Abe | |
| 8,267,431 B2 | 9/2012 | Okuno | |
| 9,109,563 B2 | 8/2015 | Roseborsky | |
| 12,084,931 B2 * | 9/2024 | McGarian | E21B 23/0413 |
| 2017/0051713 A1 * | 2/2017 | Peters | F02M 61/14 |
| 2017/0310044 A1 * | 10/2017 | Smajda | B61G 5/10 |
| 2022/0045456 A1 * | 2/2022 | Johnson | H01R 24/86 |
| 2022/0178335 A1 * | 6/2022 | Steele | F02M 61/18 |
| 2024/0055804 A1 * | 2/2024 | Purdy | H01R 13/627 |
| 2024/0263719 A1 * | 8/2024 | Szrom | F16K 11/168 |

* cited by examiner

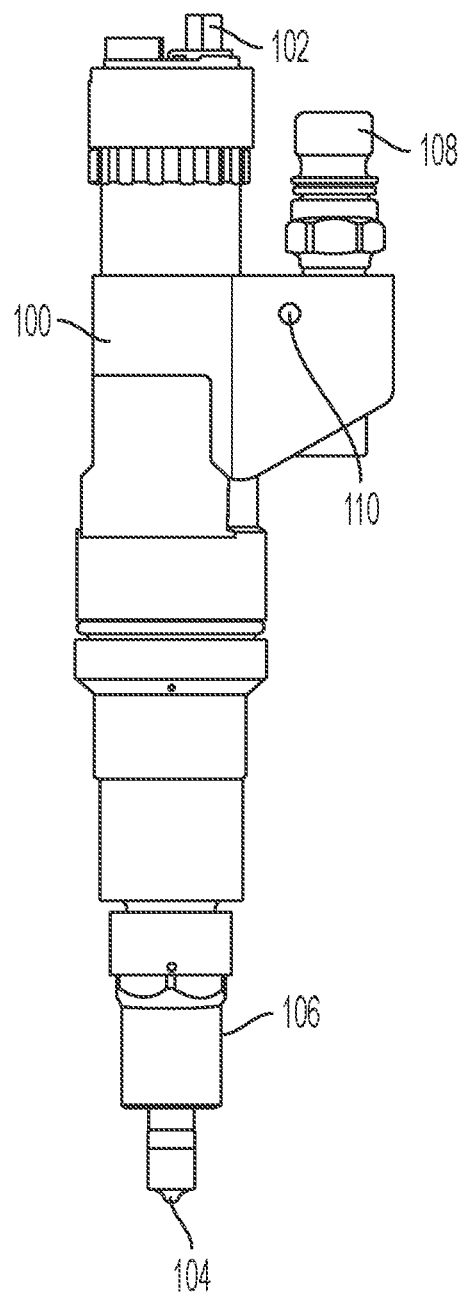
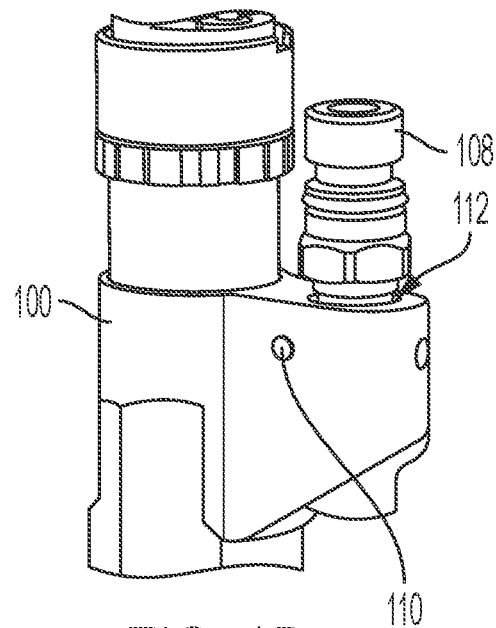
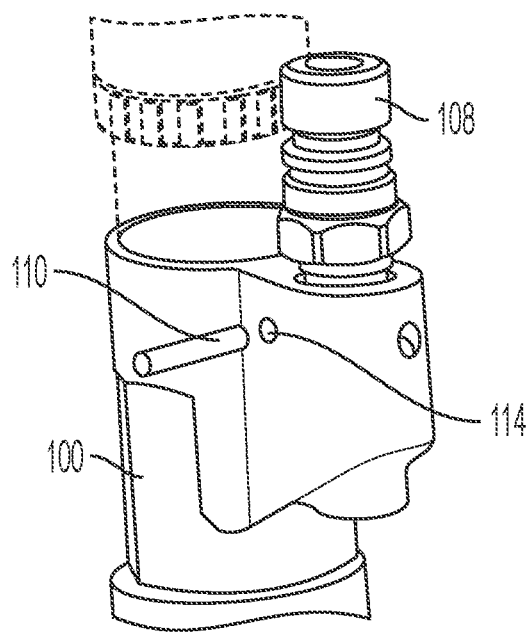
FIG. 1A
PRIOR ART
FIG. 1B
PRIOR ART
FIG. 1C
PRIOR ART

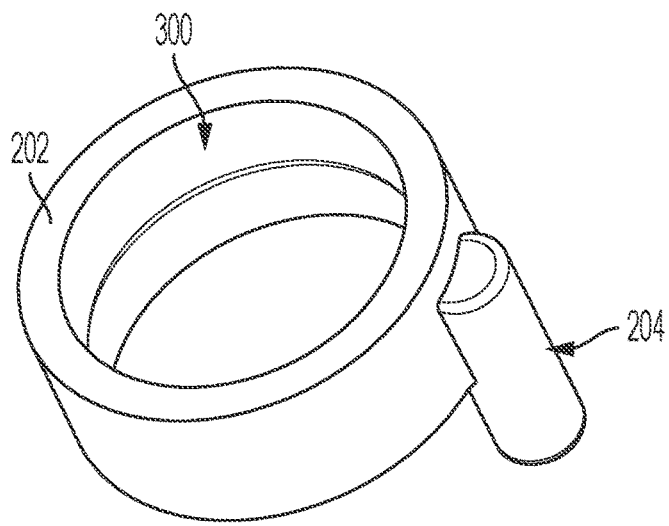
FIG. 3A
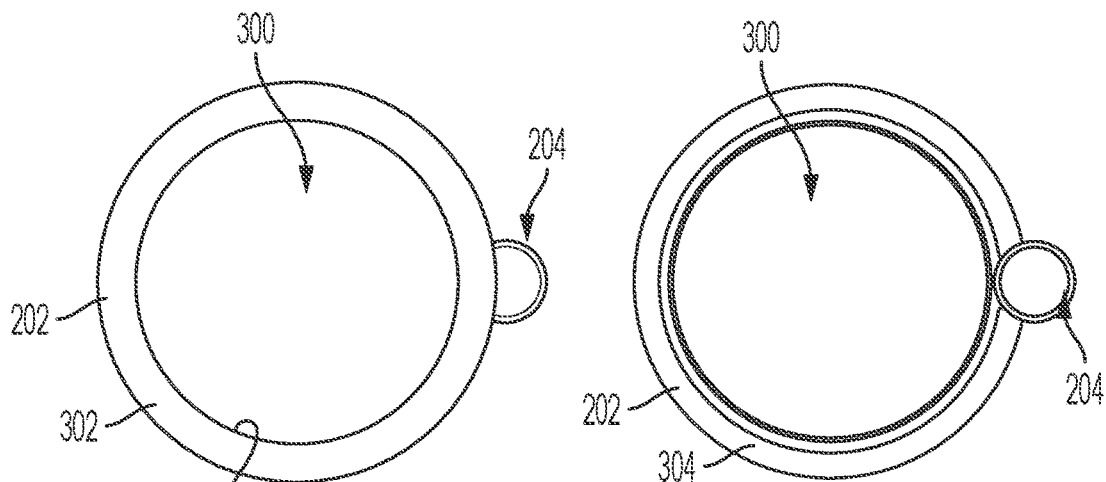
FIG. 3B
FIG. 3C
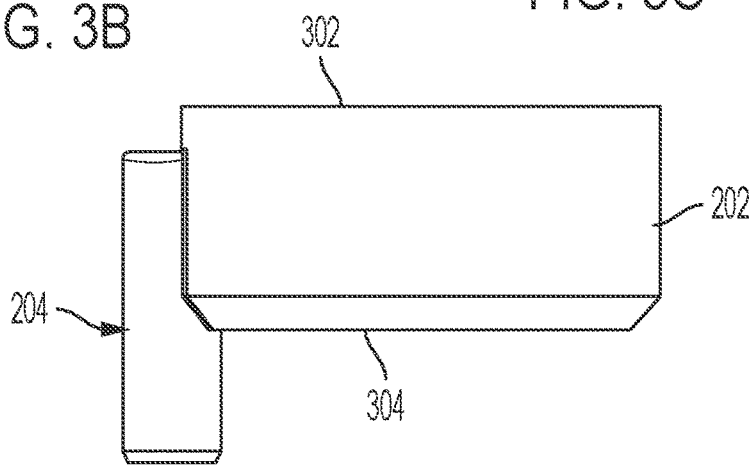
FIG. 3D

ANTI-ROTATION RETAINING MECHANISM FOR A HIGH-PRESSURE FUEL INJECTOR IN A FUEL SYSTEM

CROSS-REFERENCE TO RELATED APPLICATION

This application is a national phase filing of International Application No. PCT/US2020/067649, filed on Dec. 31, 2020, which claims priority to U.S. Provisional Application No. 62/994,032, filed on Mar. 24, 2020, and U.S. Provisional Application No. 63/014,285, filed on Apr. 23, 2020, each incorporated herein by reference in its entirety.

FIELD OF THE DISCLOSURE

The present disclosure relates generally to engine fuel systems, especially to fuel injector configurations used in such engine fuel systems.

BACKGROUND OF THE DISCLOSURE

In some common rail fuel systems, fuel is supplied to the engine fuel injectors through fuel lines extending within the cylinder head. Each fuel line fluidly couples to the injector body of the fuel injector via a connector such that a sealed fluid connection is provided by the connector between the fuel line and the injector body. To prevent the connector from sliding off the injector body, a pin is inserted into the injector body next to the connector such that the shearing force exerted by the pin on the connector causes the connector to be pressured against a side surface of the recess in the injector body in which the connector is located. However, if too much torque is applied to the connector as it is inserted into the injector body, the "over-torqueing" may result in cracks formed in the injector body, leading to pressure leakage from the cylinder head through the cracks. Therefore, there is a need to provide some mechanism for preventing the fuel line from rotating as well as over-torqueing the fuel line connector.

SUMMARY

Various embodiments of the present disclosure relate to a coupling member for coupling a fuel injection apparatus with an injector body of a fuel injector. The coupling member has a top surface, a bottom surface, and an opening extending from the top surface to the bottom surface. The opening receives the fuel injection apparatus. The coupling member also has a protruding portion extending from the bottom surface or the side surface and configured to be in contact with the injector body to prevent rotational movement of the fuel injection apparatus.

In some examples, the protruding portion extends from the bottom surface. The protruding portion may be configured to be inserted into a recessed portion on a surface of the injector body. The protruding portion may be configured to be positioned to be flush along a surface of the injector body. The coupling member may be configured to be press-fit onto the fuel injection apparatus.

In some examples, the protruding portion extends from the side surface. The protruding portion may have a top portion and a bottom portion both located between the top surface and the bottom surface. The protruding portion may have a top portion that is flush with the top surface and a bottom portion that is flush with the bottom surface. The protruding portion may have a top portion that extends beyond the top surface and a bottom portion that extends beyond the bottom surface. Furthermore, the protruding portion may have a length that enables the protruding portion to come into contact with a side surface of the injector body.

Various embodiments of the present disclosure relate to an engine system with a fuel injection apparatus, a fuel injector with an injector body and configured to be coupled with the fuel injection apparatus, and a coupling member for coupling the fuel injection apparatus with the injector body. The coupling member has a top surface, a bottom surface, a side surface, and an opening extending from the top surface to the bottom surface, the opening configured to receive the fuel injection apparatus, and a protruding portion extending from the bottom surface or the side surface and configured to be in contact with the injector body to prevent rotational movement of the fuel injection apparatus.

In some examples, the injector body includes a recessed portion on a surface thereof, wherein the protruding portion is configured to be inserted into the recessed portion. In some examples, the protruding portion is configured to be positioned to be flush along a surface of the injector body. In some examples, the coupling member is configured to be press-fit onto the fuel injection apparatus. In some examples, the injector body includes a plurality of vertical grooves positioned along an outer surface of the injector body. In some examples, superglue or adhesive tape may be positioned between the fuel injection apparatus and the injector body to further reduce the movement of the fuel injection apparatus. In some examples, the protruding portion of the coupling member has a length that enables the protruding portion to come into contact with a side surface of the injector body.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 1A is a side view of an injector body with a connector inserted thereto as known in the art.

FIG. 1B is a perspective close-up view of a portion of the injector body at the connector as known in the art.

FIG. 1C is a perspective close-up view of a portion of the injector body with a pin located proximate to an opening on the injector body as known in the art.

FIG. 3A is a perspective view of a retainer component according to an embodiment.

FIG. 3B is a top view of the retainer of FIG. 3A according to an embodiment.

FIG. 3C is a bottom view of the retainer of FIG. 3A according to an embodiment.

FIG. 3D is a side view of the retainer of FIG. 3A according to an embodiment.

Figure 2D:
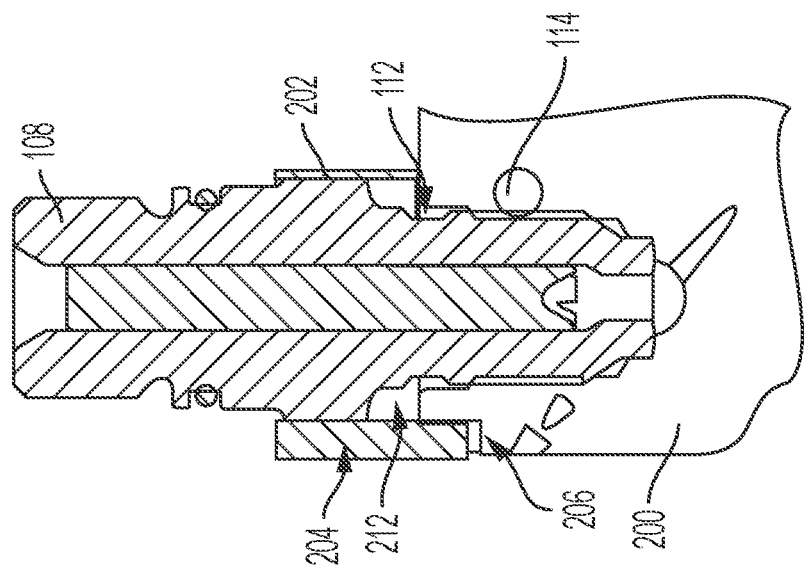
FIG. 2D is a cross-sectional view of the connector of FIG. 2A as implemented in a fuel injector body according to an embodiment.
Figure 2B:
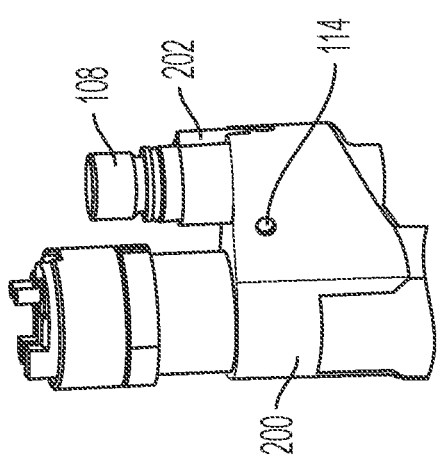
FIG. 2B is a close-up view of a portion of the injector body of FIG. 2A according to an embodiment.
Figure 2C:
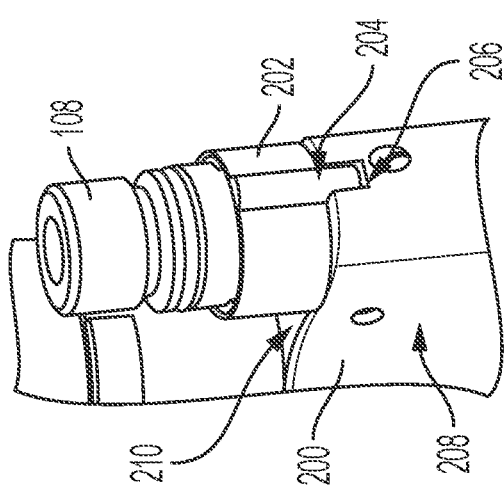
FIG. 2C is a close-up view of a portion of the connector of FIG. 2A according to an embodiment.

Corresponding reference characters indicate corresponding parts throughout the several views. The exemplifications set out herein illustrate exemplary embodiments of the disclosure and such exemplifications are not to be construed as limiting the scope of the disclosure in any manner. While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

FIGS. 1A through 1C show an example of a fuel injector body 100 as known in the art. The fuel injector body 100 has a plurality of openings to which other components can be attached. An electrical connection 102 can be attached to the injector body 100 on one end, and a nozzle 104 can be attached to the other end of the injector body 100. The nozzle 104 is held in place using a nozzle cap nut 106 placed around a portion of the injector body 100 to hold the nozzle 104 in place with respect to the injector body 100. The injector body 100 also includes an opening 112 to insert a connector 108 which fluidly couples the injector body 100 with a fuel line (not shown). The opening 112 leads to a fuel passage (not shown) that fluidly connects the fuel line to the nozzle 104.

A pin 110 is inserted into a bore 114 located proximate to the connector 108 such that the pin 110 prevents the connector 108 from rotating once the connector 108 is inserted into the injector body 100. This is achieved by having the pin 110 inserted into the bore 114 prior to having the connector 108 attached to the injector body 100, and the connector 108 is inserted into the opening 112 by applying torque to rotate the connector 108. Therefore, as more torque is applied to the connector 108, the pin 110 exerts more internal stress against the connector 108 as well as the injector body 100. However, if too much torque is applied (a.k.a. over-torqueing), cracks may be formed in the injector body 100 that lead to high-pressure leakage from the injector body.

Other disadvantages exist in using the pin 110 to immobilize the connector 108. For example, using the pin 110 can generate debris during the pin press operation to press the pin into the bore 114, and the debris can get into the injector assembly, leading to additional wash cycles being necessary during manufacture. Debris can also build up at the sealing surface between the injector body 100 and the connector 108 during the seal/unseal process that occurs due to improper torque application. Furthermore, the installation of the pin 110 can become a safety issue when applying high forces to shear the connector 108 which can create pin breakage or offset forces applied the injector body 100 which can lead to the injector body 100 cracking due to increased thread stress. Additionally, the pin installation architecture requires specialized surface tooling, which may not be readily available for serviceability in the field in some situations, which leads to improper field service and early life failures.

FIGS. 2A through 2D show an example of a fuel injector body 200 according to embodiments disclosed herein. Similar to the injector body 100, the injector body 200 has the opening 112 to insert the connector 108. In some examples, the injector body 200 may retain the bore 114, although there is no pin 110 that is inserted therethrough. The connector 108 has an anti-rotation retainer 202 placed around the connector 108 in a tight fit such that friction between an inner surface of the retainer 202 and an outer surface of the connector 108 keeps the retainer 202 attached to the connector 108.

In some examples, an adhesive such as liquid superglue or abrasion tape may be applied in a threaded portion of the connector 108 or the opening 112 before screwing the connector 108 into the opening 112. In some examples, the retainer 202 has a protruding portion 204 (which may also be referred to as "extension" or "key") that couples to and fits into a recessed portion 206 (which may also be referred to as a "pocket" that receives the key) of the injector body 200. The protruding portion 204 protrudes from one or more surfaces of the retainer 202 such that the retainer 202 is coupled with and locked in place relative to the injector body 200 when the protruding portion 204 of the retainer 202 is inserted into the recessed portion 206 of the injector body 200. Alternatively, the retainer 202 can also be rotated approximately 90 degrees clockwise or counterclockwise from the position shown in FIGS. 2A through 2D such that the protruding portion 204 is in contact with an external sidewall 208 of the injector body 200. That is, instead of the recessed portion 206, the protruding portion 204 of the retainer 202 can be held in place using the sidewall 208 of the injector body 200. In some examples, the protruding portion 204 may have a length of between 3 mm and 5 mm, 5 mm and 8 mm, 8 mm and 1 cm, 1 cm and 1.5 cm, 1.5 cm and 2 cm, or any other suitable length to prevent rotation of the connector 108.

FIGS. 3A through 3D illustrate an example of the retainer 202 as viewed from different angles, according to some embodiments. The retainer 202 as shown includes an opening 300 extending from a top surface 302 to a bottom surface 304. The opening 300 is configured such that the connector 108 for a fuel line can be inserted and immobilized by the connector 108, and the key 204 protrudes from the retainer 202 such that the end of the key 204 extends beyond the bottom surface 304 of the retainer 202. The cross-section of the retainer 202 and the key 204 may be any suitable shape, including but not limited to circular, ovular, polygonal, etc. The shape and size of the opening 300 are defined by an inner surface 306 of the retainer 202, where the inner surface 306 may be flat, curved, ridged, jagged, etc., to allow coupling of the connector 108 to the retainer 202.

As an example, the inner surface 306 can also be formed similar to a lug installation tool such that the opening 300 has a hexagonal shape when seen from above or below. The coupling can be formed by press-fitting, via any suitable mechanical means, the retainer 202 around the connector 108 after the connector 108 is attached to the injector body 200. In doing so, the key 204 is configured to extend past a top surface 210 of the injector body 200 and is either inserted into the recessed portion 206 or positioned adjacent to the sidewall 208 of the injector body 200 to prevent rotation of the connector 108 during installation and removal of the high-pressure fuel lines.

In some examples, instead of the retainer 202 being manufactured to fit the shape of the connector 108, the connector 108 can be manufactured to fit the shape of the retainer 202. As shown in FIGS. 4A through 4D, the connector 108 is formed such that an exterior surface 402 includes a plurality of recesses or grooves 404 that are aligned vertically to accommodate for the press-fitting of the retainer 202 around the exterior surface 402. The recesses or grooves 404 can also be used to flush out any debris that may have entered a gap 212 between the connector 108 and the retainer 202 during installation. The connector 108 is shown with an inlet 400 which receives the fuel line and an outlet 406 which fluidly couples with the injector body 200. Fuel enters the inlet 400 and exits the outlet 406.

The retainer 202 offers improvements over the previously known method of inserting the pin 110 into the injector body 100 in terms of a more accurate fitting mechanism that is easier to install. As previously explained, the pin insertion method of fixing the connector 108 to the injector body 100 risks improperly applying too much torque on the injector body 100 to cause cracks in the injector body 100 leading to leakage of pressure within the injector body 100. However, the retainer 202 eliminates the risk by replacing a method that uses rotational force to immobilize the connector 108 with a method that uses longitudinal force (that is, in the direction of the longitudinal axis of the connector 108) to do so. Therefore, even when the connector 108 exerts rotational force during installation or removal of the fuel line, the rotational force is not absorbed by the inside of the injector body 200 but rather by the external surface of the injector body 200 because the retainer 202, which is configured to move along with the connector 108, in turn releases the rotational force onto the external surface of the injector body 200. As such, the retainer 202 improves robustness of injector sealing surfaces during line installation and removal, and also makes the connector 108 more serviceable and re-manufacturable.

Figure 5A:
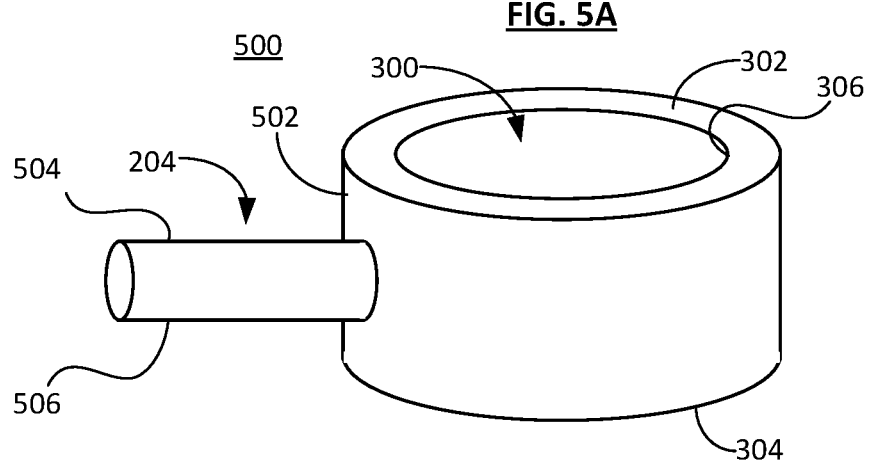
FIG. 5A is a perspective view of a retainer component according to an embodiment.
Figure 5B:
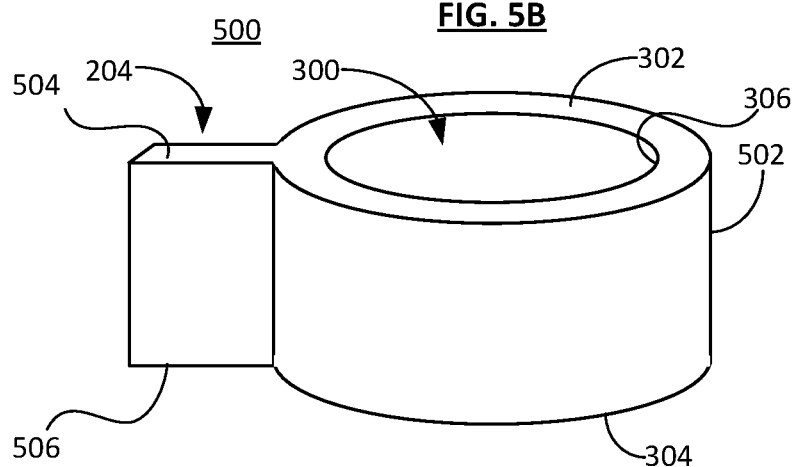
FIG. 5B is a perspective view of a retainer component according to an embodiment.
Figure 5C:
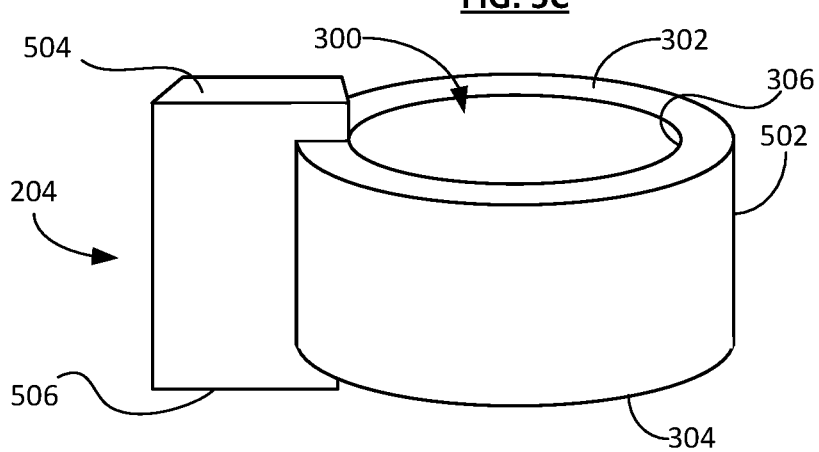
FIG. 5C is a perspective view of a retainer component according to an embodiment.

Furthermore, FIGS. 5A through 5C each illustrates an additional example of an anti-rotation retainer 500, according to some embodiments, with the key or protruding portion 204 protruding from the bottom surface and/or the side surface of the retainer 500. The retainer 500 in FIG. 5A as shown includes an opening 300 extending from a top surface 302 to a bottom surface 304, similar to the retainer 202 in FIGS. 3A through 3D. However, instead of the key 204 protruding from the bottom surface 304 as in the previous examples, the protruding portion 204 of the retainer 500 extends or protrudes from a side surface 502 of the retainer 500, where the side surface 502 extends between the top surface 302 and the bottom surface 304. The cross-section of the retainer 500 and the protruding portion 204 may be any suitable shape, including but not limited to circular, ovular, polygonal, etc. The inner surface 306 defines the opening 300 and may be flat, curved, ridged, jagged, etc., to allow coupling of the connector 108 to the retainer 500.

Figure 2A:
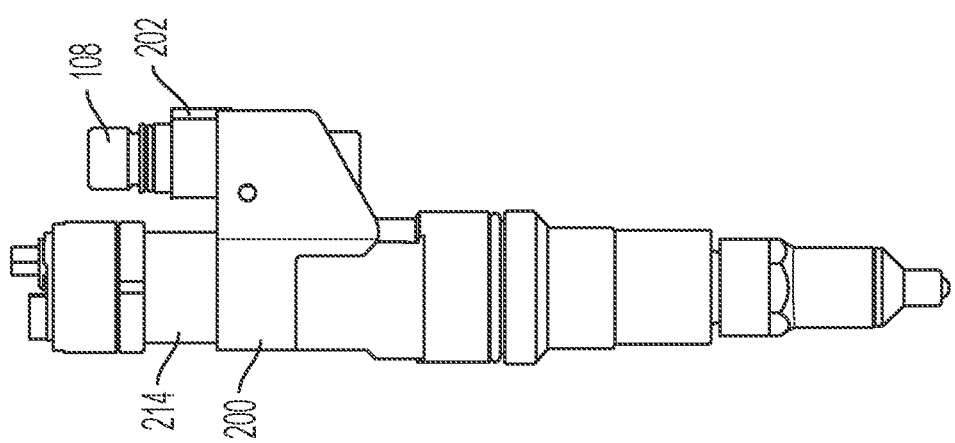
FIG. 2A is a side view of an injector body with a connector inserted thereto according to an embodiment.
Figure 4A:
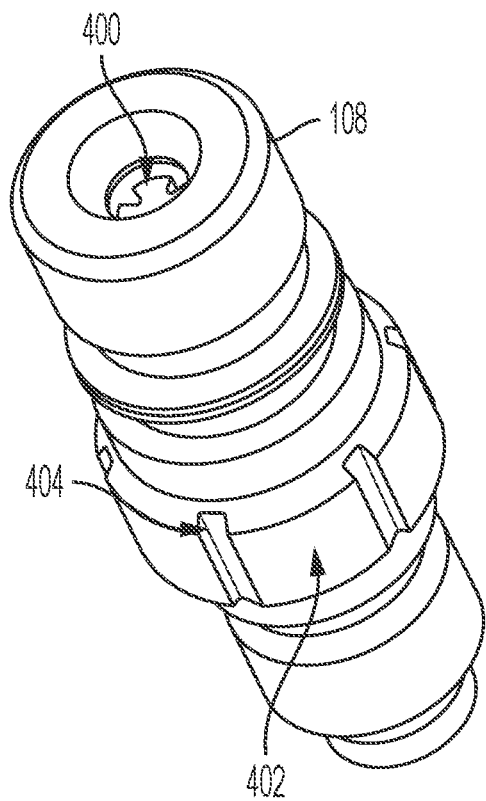
FIG. 4A is a perspective view of a connector to be implemented in a fuel injector according to an embodiment.
Figure 4B:
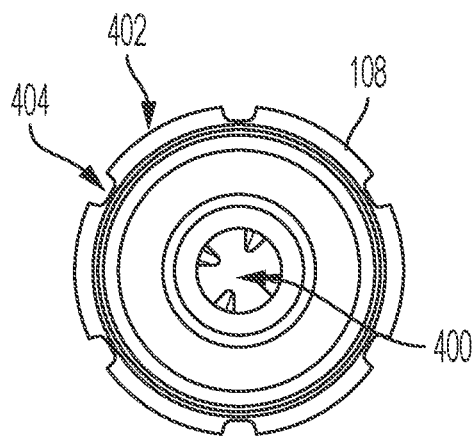
FIG. 4B is a top view of the connector of FIG. 4A according to an embodiment.
Figure 4C:
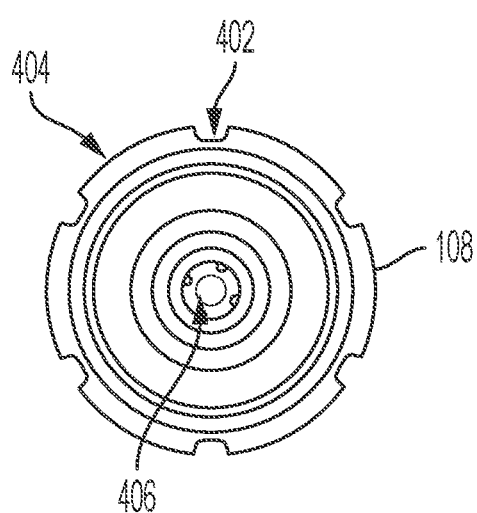
FIG. 4C is a bottom view of the connector of FIG. 4A according to an embodiment.
Figure 4D:
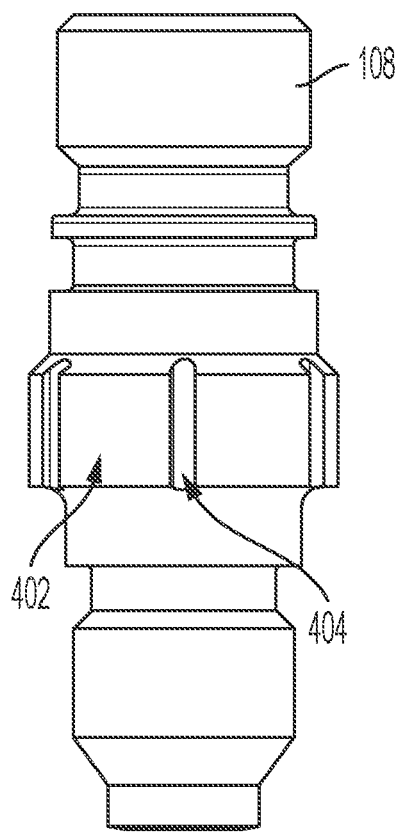
FIG. 4D is a side view of the connector of FIG. 4A according to an embodiment.

In FIG. 5A, for example, the protruding portion 204 resembles a cylindrical component that protrudes radially from the side surface 502, although any suitable shape may be employed for the protruding portion 204. The length of the protruding portion 204 is determined based upon the distance of the retainer 500 from a side surface 214 of the fuel injector body 200 as shown in FIG. 2A. Specifically, the length of the protruding portion 204 needs to be sufficiently long such that the protruding portion 204 comes into contact with the side surface 214 of the fuel injector body 200. The protruding portion 204 has a thickness or width (or diameter if the protruding portion 204 is cylindrical as shown) that is less than the thickness or width of the side surface 502. That is, the protruding portion 204 does not extend the entire distance between the top surface 302 and the bottom surface 304. For example, the protruding portion 204 has a top portion 504 and a bottom portion 506 (which may also be referred to as a top surface and a bottom surface, respectively), and in the example shown, the top portion 504 and the bottom portion 506 are both located between the top surface 302 and the bottom surface 304 of the retainer 500.

In FIG. 5B, the protruding portion 204 is an extension of the side surface 502. That is, the side surface 502 is formed to incorporate the extension 204 that extends the entire length between the top surface 302 and the bottom surface 304 such that the top surface 302 and the bottom surface 304 at least partially defines the extension 204. The extension 204 may also have a sufficient length to come into contact with the side surface 214 of the fuel injector body 200. According to some embodiments, the top portion 504 of the extension 204 is flush with the top surface 302 and the bottom portion 506 is flush with the bottom surface 304.

In FIG. 5C, the protruding portion 204 extends beyond both the top surface 302 and the bottom surface 304 such that the protruding portion 204 protrudes from both surfaces. Therefore, the top portion 504 of the protruding portion 204 extends beyond the top surface 302 and the bottom portion 506 also extends beyond the bottom surface 304. Therefore, the height of the protruding portion 204 may be greater than the height of the side surface 502. Similar to the previous examples, the protruding portion 204 may also have a sufficient length to come into contact with the side surface 214 of the fuel injector body 200.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising:
a fuel injector including an injector body, the injector body including an injector body top surface, an opening extending downward from the injector body top surface at a central location of the injector body, and a recessed portion extending downward from the injector body top surface;
a connector inserted into the opening of the injector body and configured to fluidly couple the injector body with a high pressure fuel line; and
a coupling member including a top surface, a bottom surface, a side surface, and an opening extending from the top surface to the bottom surface, and a protruding portion extending outward from the side surface and downward from the bottom surface;
wherein the coupling member is press-fit around the connector with the connector received in the opening with a tight fit such that friction between an inner surface of the opening and an outer surface of the connector contributes to keeping the coupling member attached to the connector and the protruding portion extending into the recessed portion of the injector body contacts a sidewall of the injector body to provide additional friction between the protruding portion and the sidewall contributing to keeping the coupling member attached to the connector.

2. The apparatus of claim 1, wherein the protruding portion is configured to be inserted into the recessed portion on a surface of the injector body.

3. The apparatus of claim 1, wherein the protruding portion is configured to be positioned to be flush along a surface of the injector body.

4. The apparatus of claim 1, wherein the protruding portion is the only structure of the coupling member extending downward from the bottom surface.

5. The-apparatus of claim 1, the protruding portion having a top portion and a bottom portion both located between the top surface and the bottom surface.

6. The apparatus of claim 1, the protruding portion having a top portion that is flush with the top surface and a bottom portion that is flush with the bottom surface.

7. The apparatus of claim 1, the protruding portion having a top portion that extends beyond the top surface and a bottom portion that extends beyond the bottom surface.

8. The apparatus of claim 1, wherein a friction fit is provided between an inner surface of the coupling member and an outer surface of the fuel injection apparatus to keep the coupling member attached to the fuel injection apparatus.

9. An engine system comprising:
   a fuel injection apparatus;
   a fuel injector having an injector body,
   the injector body configured to be coupled with the fuel injection apparatus; and
   a coupling member for coupling the fuel injection apparatus with the injector body, comprising,
      a top surface, a bottom surface, a side surface, and an opening extending from the top surface to the bottom surface, the opening configured to receive the fuel injection apparatus, and
      a protruding portion extending laterally from the side surface of the coupling member,
      wherein the coupling member is press-fit around the fuel injection apparatus with the fuel injection apparatus received in the opening with a tight fit such that friction between an inner surface of the opening and an outer surface of the fuel injection apparatus contributes to keeping the coupling member attached to the fuel injection apparatus and the protruding portion extending into the recessed portion of the injector body contacts a sidewall of the injector body to provide additional friction between the protruding portion and the sidewall contributing to keeping the coupling member attached to the connector.

10. The engine system of claim 9, wherein the protruding portion is configured to be inserted into the recessed portion on a side surface of the injector body.

11. The engine system of claim 9, wherein the protruding portion is configured to be positioned to be flush along a surface of the injector body.

12. The engine system of claim 9, wherein the protruding portion is the only structure of the coupling member extending downward from the bottom surface.

13. The engine system of claim 9, wherein the fuel injection apparatus includes a plurality of vertical grooves positioned along an outer surface of the fuel injection apparatus to allow debris accumulated between the fuel injection apparatus and the coupling member during installation to flow out.

14. The engine system of claim 9, further comprising superglue or adhesive tape positioned between the fuel injection apparatus and the injector body to further reduce the movement of the fuel injection apparatus.

15. The engine system of claim 9, wherein the protruding portion comprises a cylindrical shape.

16. An engine system comprising:
   a fuel injection apparatus;
   a fuel injector having an injector body,
   the injector body configured to be coupled with the fuel injection apparatus; and
   a coupling member for coupling the fuel injection apparatus with the injector body, comprising,
      a top surface, a bottom surface, a side surface, and an opening extending from the top surface to the bottom surface, the opening configured to receive the fuel injection apparatus, and
      a protruding portion extending laterally from the side surface of the coupling member,
      wherein the coupling member is press-fit around the fuel injection apparatus with the fuel injection apparatus received in the opening with a tight fit such that friction between an inner surface of the opening and an outer surface of the fuel injection apparatus keeps the coupling member attached to the fuel injection apparatus and the protruding portion extending into the recessed portion of the injector body,
   wherein the coupling member is press-fit around the connector with the connector received in the opening with a tight fit such that friction between an inner surface of the opening and an outer surface of the connector contributes to keeping the coupling member attached to the connector and the protruding portion extending into the recessed portion of the injector body contacts a sidewall of the injector body to provide additional friction between the protruding portion and the sidewall contributing to keeping the coupling member attached to the connector.

17. The coupling member of claim 1, wherein the fuel injection apparatus includes a plurality of vertical grooves positioned along an outer surface of the fuel injection apparatus to allow debris accumulated between the fuel injection apparatus and the coupling member during installation to flow out.

18. The engine system of claim 16, wherein the protruding portion is the only structure of the coupling member extending downward from the bottom surface.

19. The engine system of claim 18, the protruding portion comprises a cylindrical shape.

20. The apparatus of claim 1, wherein the protruding portion comprises a cylindrical shape.

* * * * *